United States Patent
Ozarek et al.

(10) Patent No.: US 12,018,878 B2
(45) Date of Patent: Jun. 25, 2024

(54) VALVE SYSTEM FOR A REFRIGERATOR APPLIANCE

(71) Applicant: WHIRLPOOL CORPORATION, Benton Harbor, MI (US)

(72) Inventors: Maciej Ozarek, Wroclaw (PL); Pratyaksh Rohatgi, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 409 days.

(21) Appl. No.: 17/533,633

(22) Filed: Nov. 23, 2021

(65) Prior Publication Data

US 2023/0160621 A1    May 25, 2023

(51) Int. Cl.
  *F25C 5/20* (2018.01)
  *F25C 1/24* (2018.01)
  *F25D 23/12* (2006.01)
  *F25D 25/00* (2006.01)

(52) U.S. Cl.
  CPC .............. *F25C 5/22* (2018.01); *F25C 1/24* (2013.01); *F25D 23/126* (2013.01); *F25D 25/00* (2013.01); *F25C 2400/10* (2013.01); *F25C 2400/14* (2013.01)

(58) Field of Classification Search
  CPC .................................................. F16L 19/005
  USPC ............................................. 285/82, 89, 92
  See application file for complete search history.

(56) References Cited

U.S. PATENT DOCUMENTS

| | | | | |
|---|---|---|---|---|
| 4,697,608 A * | 10/1987 | Kolze | ............... | F16K 31/0658 285/82 |
| 5,048,872 A * | 9/1991 | Gehring | ............... | H02G 3/0675 411/269 |
| 5,082,240 A * | 1/1992 | Richmond | ............ | F16K 31/404 138/45 |
| 5,215,336 A * | 6/1993 | Worthing | ............... | F16L 19/005 411/937 |
| 5,269,333 A * | 12/1993 | Richmond | ............ | F16K 31/404 251/38 |
| 5,362,111 A * | 11/1994 | Harbin | ................... | F16L 19/005 285/330 |
| 5,655,750 A | 8/1997 | Smock et al. | | |
| 5,810,331 A | 9/1998 | Smock et al. | | |
| 5,921,275 A | 7/1999 | Knop et al. | | |
| 6,036,236 A * | 3/2000 | Bensel | ................... | F28F 9/0248 411/953 |
| 6,460,367 B1 | 10/2002 | DuHack | | |
| 9,217,515 B2 * | 12/2015 | DuHack | ................... | F16K 47/16 |
| 9,677,802 B2 | 6/2017 | Lee | | |
| 9,869,415 B2 * | 1/2018 | Kumar | ................... | F16L 19/025 |
| 2011/0169258 A1 | 7/2011 | Nowak et al. | | |

(Continued)

*Primary Examiner* — Paul R Durand
*Assistant Examiner* — Michael J. Melaragno
(74) *Attorney, Agent, or Firm* — Brooks Kushman P.C.

(57) ABSTRACT

A refrigerator includes a water system and a valve. The water system is configured to direct water to a dispenser or an ice maker. The valve includes a valve body, an inlet port, and a clutch. The valve is configured to connect the water system to a water source. The inlet port is configured to receive a tube to establish fluid communication with the water source and to engage a nut to secure the tube to the inlet port. The clutch is disposed between the inlet port and the valve body and is configured to slip in response to an applied torque to the inlet port exceeding a threshold.

20 Claims, 4 Drawing Sheets

(56) References Cited

U.S. PATENT DOCUMENTS

| | | | |
|---|---|---|---|
| 2011/0175348 A1* | 7/2011 | Bogert | F16L 19/10 |
| | | | 285/313 |
| 2014/0284918 A1 | 9/2014 | Kumar | |
| 2018/0313463 A1* | 11/2018 | Bergbauer | F16K 31/404 |
| 2018/0347884 A1 | 12/2018 | Kang | |
| 2022/0228799 A1* | 7/2022 | Giacomini | F16K 11/22 |
| 2023/0160621 A1* | 5/2023 | Ozarek | F25C 1/24 |
| | | | 222/146.6 |

* cited by examiner

VALVE SYSTEM FOR A REFRIGERATOR APPLIANCE

TECHNICAL FIELD

The present disclosure relates to an appliance such as a refrigerator.

BACKGROUND

In order to keep food fresh, a low temperature must be maintained within a refrigerator to reduce the reproduction rate of harmful bacteria. Refrigerators circulate refrigerant and change the refrigerant from a liquid state to a gas state by an evaporation process. A compressor increases the pressure, and in turn, the temperature of the gas refrigerant. This heated gas is then cooled by ambient air received from one or more vents often disposed on a rear portion of the refrigerator.

Refrigerators may also include systems that require a water supply. Such systems may be configured to produce ice cubes or to deliver water to a user via a dispensing device that may be located on a door of the refrigerator.

SUMMARY

A refrigerator includes a water system and a valve. The water system is configured to direct water to a dispenser or an ice maker. The valve includes a valve body, an inlet port, and a clutch. The valve is configured to connect the water system to a water source. The inlet port is configured to receive a tube to establish fluid communication with the water source and to engage a nut to secure the tube to the inlet port. The clutch is disposed between the inlet port and the valve body and is configured to slip in response to an applied torque to the inlet port exceeding a threshold.

An inlet water valve for a refrigerator includes a valve body, a threaded inlet, and a clutch. The threaded inlet is configured to receive a conduit to establish fluid communication between a water source and the valve body. and to engage a fastener to secure the conduit to the threaded inlet. The clutch is disposed between the threaded inlet and the valve body and is configured to slip in response to a connecting torque between the fastener and the threaded inlet exceeding a threshold.

A valve includes a valve body, an inlet port, and a clutch. The inlet port is configured to receive a conduit to establish fluid communication with a water source and to engage a fastener to secure the conduit to the inlet port. The clutch is disposed between the inlet port and the valve body and is configured to slip in response to a connecting torque between the fastener and the inlet port exceeding a threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
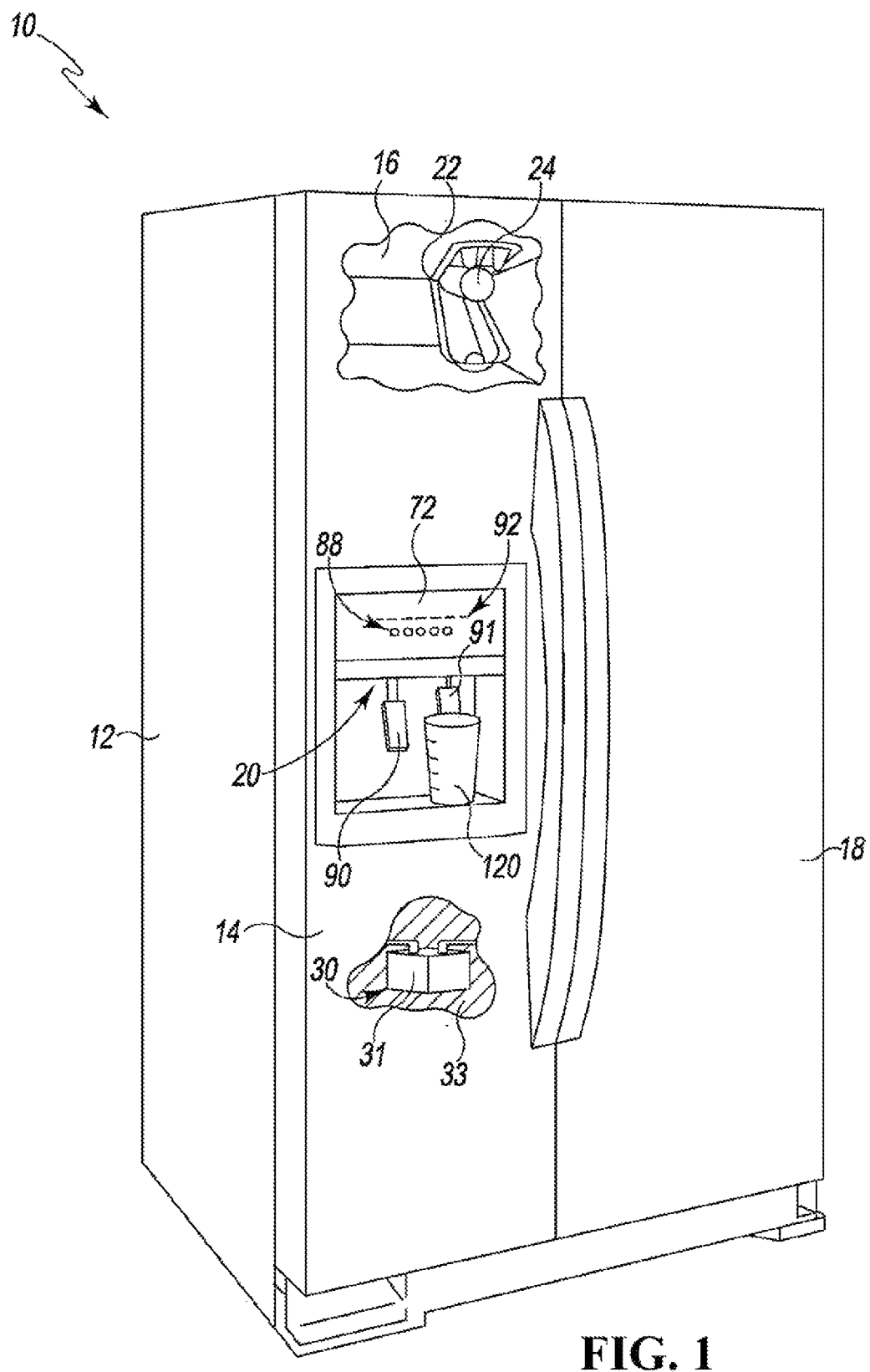
FIG. 1 is an isometric view of a refrigerator appliance.

Referring to FIG. 1, a home appliance is shown as a domestic refrigerator appliance 10 (hereinafter refrigerator 10). The refrigerator 10 includes a cabinet 12, a refrigerator door 14 for accessing a refrigerated compartment 16 of the refrigerator 10, and a freezer door 18 for accessing a frozen compartment (not shown) of the refrigerator 10.

The refrigerator 10 also includes a dispenser 20 coupled to the refrigerator door 14 and a water filter port 22 located inside the refrigerated compartment 16 of the cabinet 12. A descaling cartridge 24 is sized to be received in the water filter port 22. The dispenser 20 is configured to dispense cold water, hot water, and/or ice from the refrigerator 10. The water filter port 22 is fluidly coupled to the dispenser 20 and is configured to receive removable water filters that filter water (both liquid and ice) dispensed through dispenser 20. The descaling cartridge 24 is configured to be installed in the water filter port 22 to disperse descaling solution in the water lines leading to the dispenser 20 so that scale build-up in the water lines can be flushed through the dispenser 20.

Figure 2:
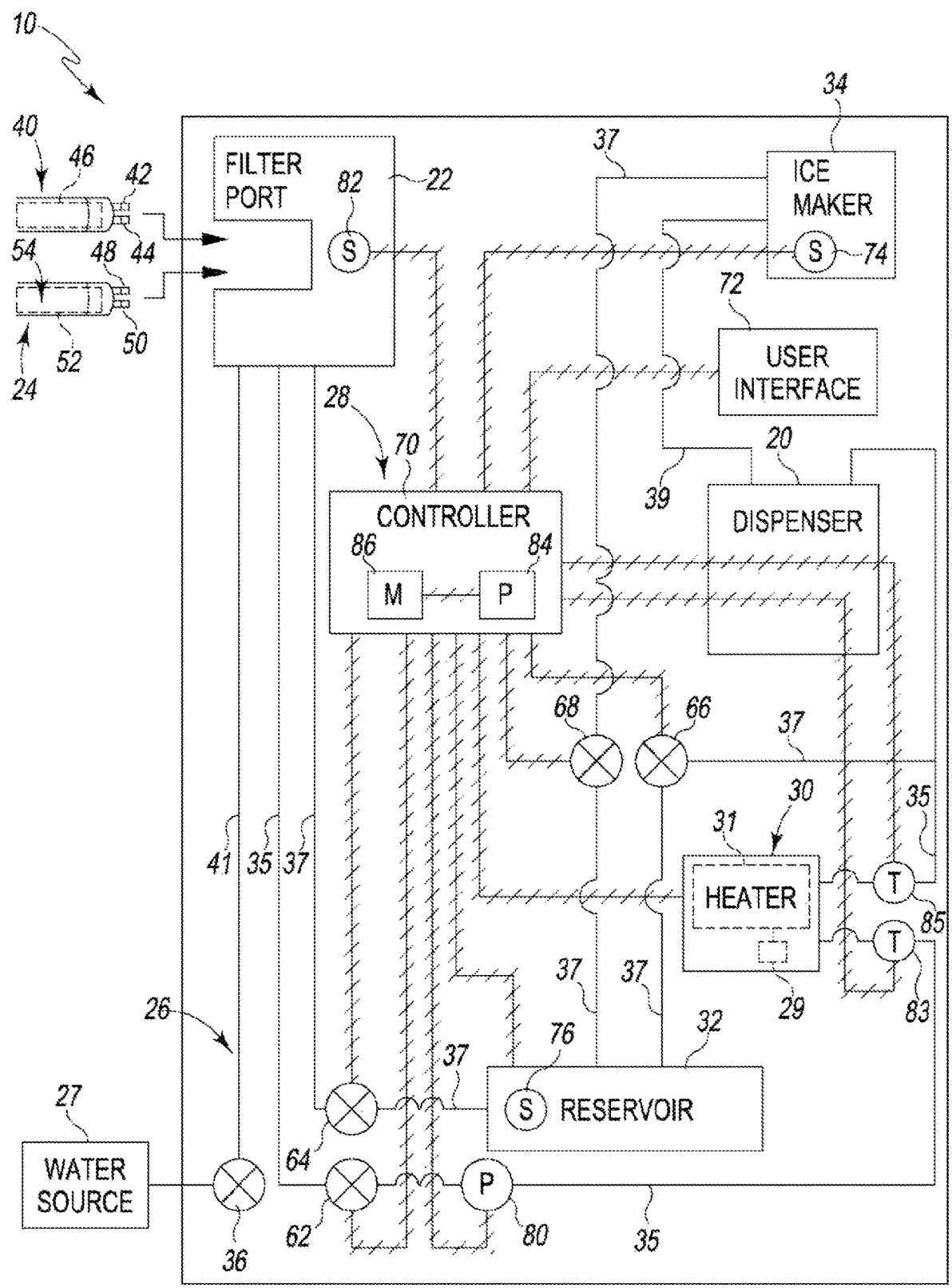
FIG. 2 is a diagrammatic view of the refrigerator appliance.

Referring now to FIG. 2, the refrigerator 10 includes a water system 26 and a control system 28 for controlling the water system 26. The water system 26 directs water from a water source 27 to the dispenser 20. The control system 28 is operable to control the various components of the water system 26 so that the dispenser 20 dispenses cold water, hot water, or ice. The control system 28 is also operable to control the water system 26 during a pre-programmed descaling cycle or other pre-programmed cycle.

The water system 26 includes a number of components for conditioning water to be discharged through the dispenser 20. In particular, the water system has a heating assembly 30, a cold water reservoir 32, and an icemaker 34. The heating assembly 30 includes a flow-through heating element 31 and a thermal fuse 29 configured to cut power to the flow-through heating element 31 when the flow-through heating element 31 reaches a predetermined temperature. The heating assembly 30 is positioned between the water filter port 22 and the dispenser 20 along a hot water line 35. The cold water reservoir 32 accumulates and cools water in the refrigerator 10 prior to the water being discharged through the dispenser 20 or supplied to the ice maker 34. The cold water reservoir 32 is positioned between the water filter port 22 and the dispenser 20 along a cold water line 37. The icemaker 34 receives cold water from the cold water reservoir 32 and generates ice that is discharged through the dispenser 20 via an ice line 39.

One exemplary flow-through heating element 31 is a Ferro Flow Through Heater (FTH). The flow-through heating element 31 is positioned in the refrigerator door 14 below the dispenser 20 and outside a refrigerator insulation layer 33 as shown, for example, in FIG. 1. The flow-through heating element 31 is illustratively oriented in a flat orientation so that water flows in a substantially horizontal direction through the flow-through heating element 31. In some embodiments, the flow-through heating element 31 may be a thermoblock element, a microwave element, or another suitable type of heating element. Additionally, the heating element may be positioned in another location in the door 14 or the cabinet 12 and may be placed in a number of orientations relative thereto. In alternative embodiments of the present disclosure, the flow-through heating element 31 may be replaced or augmented by a batch heating system including a heating element and a hot water reservoir.

All the water (liquid or ice) dispensed by the refrigerator 10 passes through the water filter port 22. The water system 26 includes a main valve 36 coupled to the water source 27 and the water filter port 22 is coupled to the main valve 36 via a water inlet line 41. The hot water line 35 and the cold water line 37 extend from the water filter port 22 directing water through the rest of the water system 26. The main valve 36 can be manually opened or closed to selectively allow water from the water source 27 to enter the water system 26 of the refrigerator 10.

The water filter port 22 is configured to receive a water filter cartridge 40 or the descaling cartridge 24. The water filter cartridge 40 is illustratively consumable and discarded after use. The water filter cartridge 40 includes an inlet 42, an outlet 44, and a filter media 46 as is known in the art. In other embodiments, the water filter cartridge 40, or portions thereof, may be reusable. The descaling cartridge 24 is illustratively consumable and is charged to supply enough descaling agent 54 for one descaling cycle. In other embodiments, the descaling cartridge 24 may be refillable and/or reusable.

The descaling cartridge 24 includes an inlet 48, an outlet 50, and a descaling packet 52 containing descaling agent 54. The inlet 48 is open to the water lines of the refrigerator 10. The descaling packet 52 is coupled to the outlet 50 and is squeezed by water flowing into the descaling cartridge 24 so that the descaling agent 54 is dispensed through the outlet 50 into the water lines. Water ceases to flow into the descaling cartridge 24 when the descaling cartridge 24 is full of water and the descaling packet 52 is emptied. The descaling agent 54 is then advanced through the water system 26 and reacts with the scale built up in the water system 26 so that the scale can be flushed out of the water system 26 when the reacted descaling agent 54 is discharged through the dispenser 20. In the illustrative embodiment, the descaling agent 54 is a solution with about an 8 percent concentration of acetic acid. In other embodiments, other organic acids including but not limited to sulfonic acids or carboxylic acids, in particular, lactic acid, acetic acid, formic acid, oxalic acid, uric acid solutions may be used alone or mixtures thereof. It is also possible to use inorganic acids such as phosphoric acid, hydrochloric acid or sulfamic acid solutions. Mixtures of various inorganic and organic acids could also conceivably be used as descaling agents in accordance with embodiments of the present invention.

In other embodiments, the inlet 48 and the outlet 50 may both be open to the water lines of the refrigerator 10. In such embodiments, the descaling packet 52 may be open inside the descaling cartridge 24 or opened when water enters the descaling cartridge 24 so that water flowing through the descaling cartridge is mixed with descaling agent. The water mixing with the descaling agent 54 dilutes and carries the descaling agent through the water lines of the refrigerator 10. In some such embodiments, the descaling agent 54 may be a liquid descaling agent or a solid agent.

The water system 26 further includes a number of electronically controlled valves that can be operated to supply hot or cold water to the dispenser 20 or to supply cold water to the icemaker 34. Specifically, the water system includes a hot water valve 62, a cold water valve 64, a cold water dispenser valve 66, and an icemaker valve 68. The hot water valve 62 is coupled between the water filter port 22 and the dispenser 20 along the hot water line 35. The cold water valve 64 is coupled between the water filter port 22 and the dispenser 20 along the cold water line 37. The cold water dispenser valve 66 is coupled between the cold water reservoir 32 and the dispenser 20 along the cold water line 37. The icemaker valve 68 is coupled between the cold water reservoir 32 and the icemaker 34 along the cold water line 37.

In operation, the hot water valve 62 can be opened to advance water from the water source 27 through the heating assembly 30 to the dispenser 20. The cold water valve 64 can be opened to advance water from the water source 27 to the cold water reservoir 32. The cold water dispenser valve 66 can be opened to advance cold water from the cold water reservoir 32 to the dispenser 20. The icemaker valve 68 can be opened to advance water from the cold water reservoir 32 to the icemaker 34. Otherwise, each of the valves 62, 64, 66, 68 are biased closed to prevent water from being advanced through the water system 26.

The control system 28 of the refrigerator 10 illustratively includes a controller 70, a user interface 72, and a number of sensors 74, 76, 80, 82, 83, 85. The controller 70 is configured to operate the components of the water system 26 in response to inputs from the user interface 72 and the sensors 74, 76, 80, 82, 83, 85. The user interface 72 is configured to display information and to receive user inputs. The sensors 74, 76, 80, 82, 83, 85 detect information and communicate information to the controller 70.

The controller 70 includes a number of electronic components commonly associated with electronic units which are utilized in the control of electromechanical systems. For example, the controller 70 may include, amongst other components customarily included in such devices, a processor such as a microprocessor 84 and a memory device 86 such as a programmable read-only memory device ("PROM") including erasable PROM's (EPROM's or EEPROM's). The memory device 86 is provided to store, amongst other things, instructions in the form of, for example, a software routine (or routines) which, when executed by the processor, allows the controller 70 to control operation of the water system 26 and other systems included in the refrigerator 10.

The user interface 72 is illustratively coupled to the controller 70 for two way communication via a signal line as shown in FIG. 2. User interface 72 includes buttons 88, paddles 90, 91, and indicator lights 92 as shown in FIG. 1. The buttons 88 may be pressed to receive user inputs requesting that water dispensed be cold or hot, that ice dispensed be cubed or crushed, or that pre-programmed cycles (such as the descaling cycle) be performed by the refrigerator 10. The paddles 90, 91 may be pressed so that the controller 70 receives inputs requesting that water or ice be discharged by the dispenser 20. The indicator lights 92 may be used to indicate the temperature of water to be dispensed, the type of ice to be dispensed, the status of the water filter cartridge 40, the need for a descaling cycle, the availability of one or more functions of the refrigerator 10, or other information. In some embodiments, the user interface 72 may include a graphic display, a touch screen, or other interface operable to display information and to receive user inputs.

The controller 70 is electrically coupled to each of the sensors 74, 76, 80, 82, 83, 85 to receive inputs from each of the sensors 74, 76, 80, 82, 83, 85 as shown in FIG. 2. In particular, the sensors 74, 76, 80, 82, 83, 85 include an ice level sensor 74, a reservoir sensor 76, temperature sensors 83, 85, a pressure sensor 80, and a filter port sensor 82. The ice level sensor 74 is coupled to the controller 70 via a signal line and is configured to detect if an ice bucket (not shown) included in the ice maker 34 is full. The reservoir sensor 76 is coupled to the controller 70 via a signal line and is configured to detect if the cold water reservoir 32 is full or the water level in the cold water reservoir 32. In the illustrative embodiment, water discharged through the dispenser 20 after being heated in the heating assembly 30 may be between 175-185° F., and may be typically be about 180° F. In other embodiments, water discharged through the dispenser 20 after being heated in the heating assembly 30 may be hotter or cooler. The pressure sensor 80 is coupled to the controller 70 via a signal line and is configured to detect back pressure applied to the heating assembly 30 through the hot water valve 62. In some embodiments, the hot water valve 62 may be configured to regulate the pressure being supplied to the heater assembly 30. The filter port sensor 82 is coupled to the controller 70 via a signal line and is configured to detect the presence of the water filter cartridge 40 or the descaling cartridge 24. The temperature sensors 83, 85 are coupled to the controller 70 and are configured to monitor the temperature of water entering and exiting the heating assembly 30. If the temperature difference between the sensors 83, 85 across the heating assembly 30 is determined by the controller 70 to be outside a predetermined range, the controller 70 may disable the heating assembly 30.

Additionally, the controller 70 is electrically coupled to the electrically controlled valves 62, 64, 66, 68 and the heating assembly 30 as shown in FIG. 2. Specifically, the cold water valve 64 is coupled to the controller 70 via a signal line so that the controller 70 can direct the cold water valve 64 to open or close. The hot water valve 62 is coupled to the controller 70 via a signal line so that the controller 70 can direct the hot water valve 62 to open or close. The icemaker valve 68 is coupled to the controller 70 via a signal line so that the controller 70 can direct the icemaker valve 68 to open or close. The cold water dispenser valve 66 is coupled to the controller 70 via a signal line so that the controller 70 can direct the cold water dispense valve 66 to open or close. The heating assembly 30 is coupled to the controller 70 via a signal line so that the controller 70 can direct the heating assembly 30 to activate or deactivate the flow-through heating element 31.

Hence, the control system 28 including the controller 70 may be operated to control operation of the refrigerator 10. In particular, the controller 70 executes a routine including, among other things, a control scheme in which the controller 70 monitors outputs of the sensors 80, 85 in order to inform a user of detected scale build-up and to control the availability of hot water when water system 26 contains built up scale. To do so, the controller 70 communicates with the sensors 80, 85 in order to determine, among other things, if the water system 26, (and more particularly, if the components of the hot water line 35 that conducts water for the hot water function) is likely to contain a predetermined amount of scale build-up as indicated by an elevated temperature or pressure of water flowing through the dispenser 20. In some embodiments, the controller may communicate with both temperature sensors 83, 85 and compare the temperature rise across the heating assembly 30 to determine scale build up. Armed with this data, the controller 70 determines if a descaling cycle is desirable and if continued operation of the hot water function is allowable. Once it is determined if a descaling cycle is found to be desirable, the controller 70 can direct the user interface 72 to display a request for a user to initiate the descaling cycle. If the controller 70 determines that the continued operation of the hot water function is not allowable, the controller 70 can disable the water system 26 from providing hot water to the dispenser 20.

Figure 3:
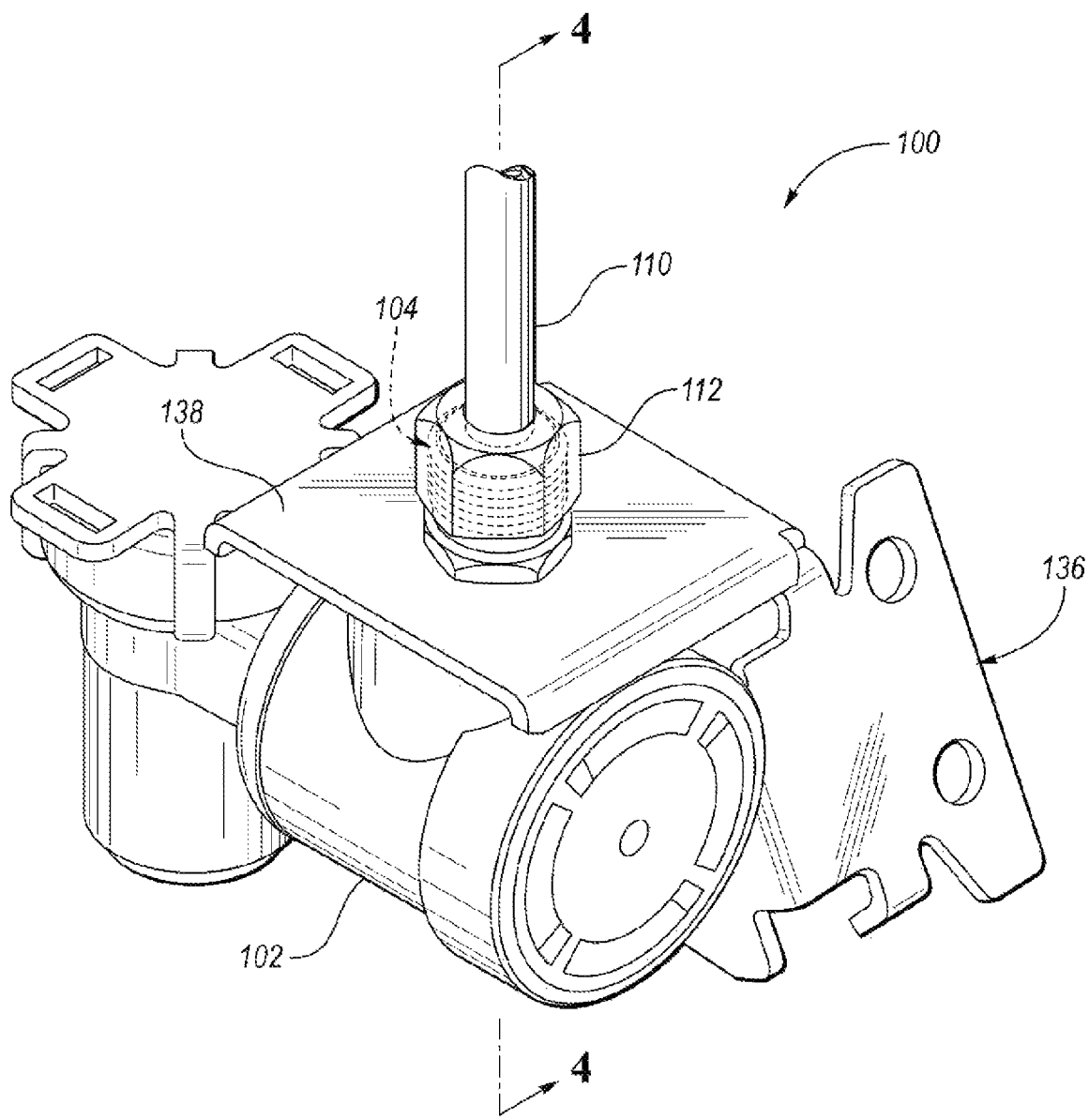
FIG. 3 is an isometric view of a valve assembly.
Figure 4:
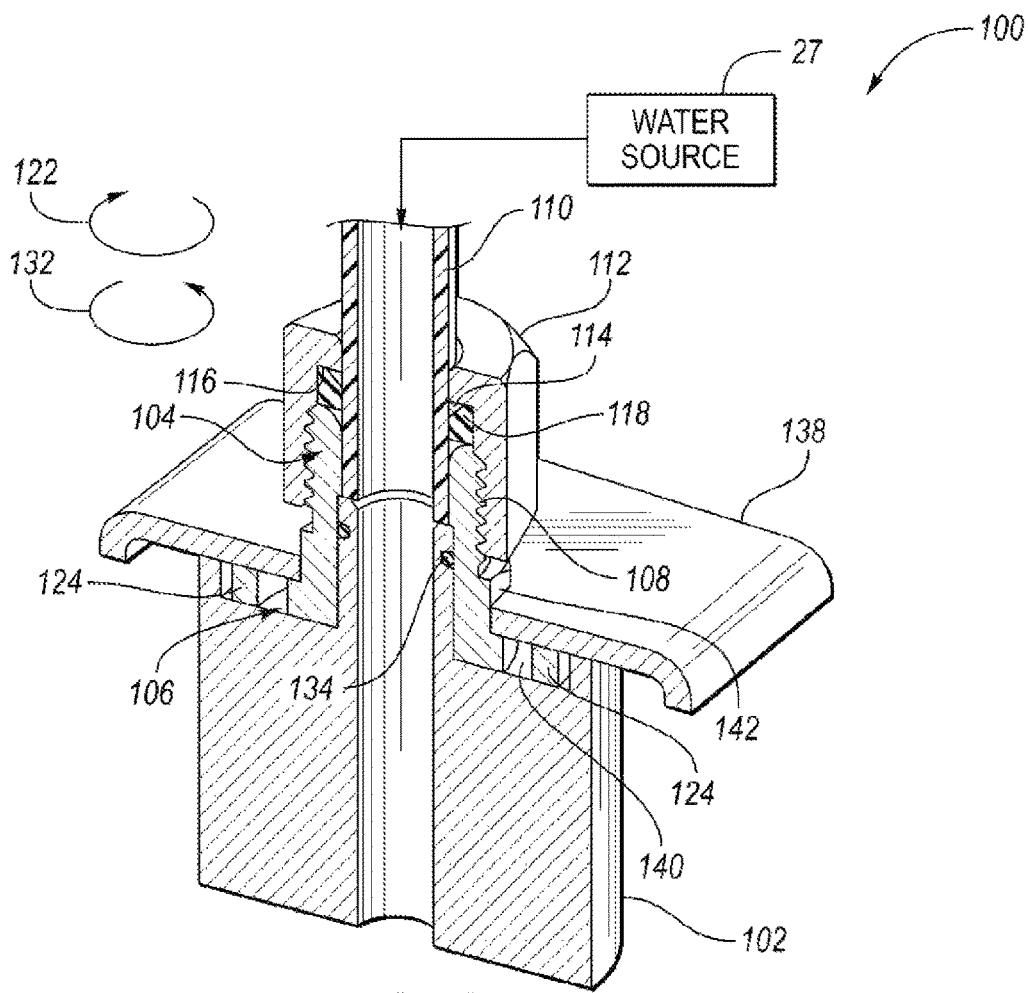
FIG. 4 is a partial cross-sectional view taken along line 4-4 in FIG. 3.
Figure 5:
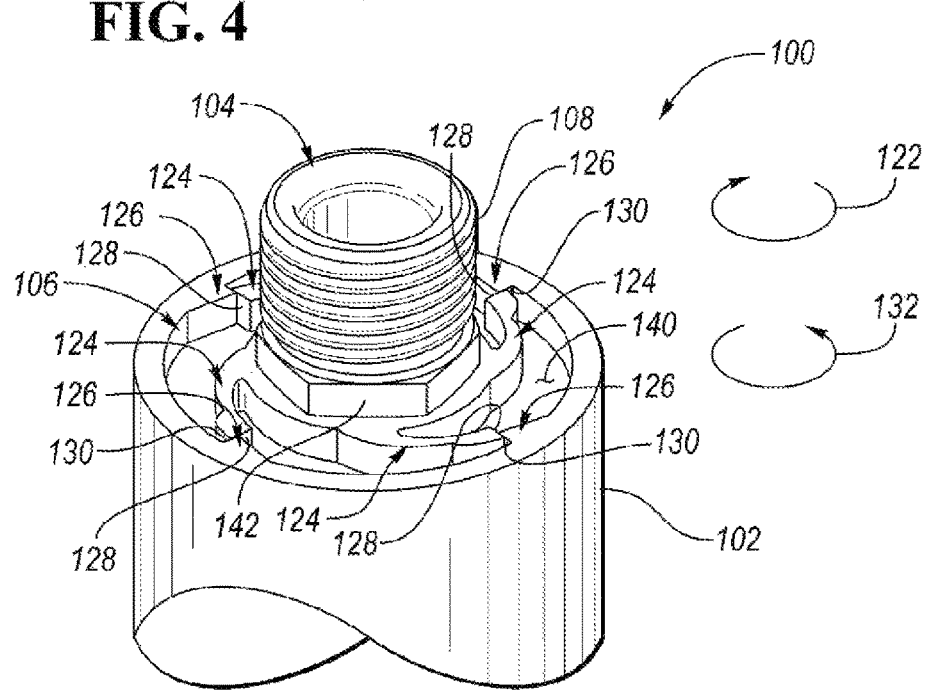
FIG. 5 is a partial view of the valve assembly illustrating a clutch mechanism that is configured to limit an amount of torque that may be applied to an inlet port of the valve assembly.

Referring to FIGS. 3-5, a valve assembly 100 is illustrated. The valve assembly 100 may represent any of the valves described herein (e.g., valves 36, 62, 64, 66, or 68). However, the valve assembly 100 may particularly represent the main valve 36 or an inlet valve to the water system 26, which a user may need to connect to the water source 27 upon installation of the refrigerator 10.

The user may over tighten a connection between the water source 27 and the main valve 36. The connection may comprise a tube or conduit and a fastener (e.g., a nut) that secures the tube or conduit to an inlet port of the main valve 36. Over tightening the connection may lead to breaking the neck of an inlet port. On the other hand, the user may not tighten the connection properly, which could lead to water leaks around the inlet port of the main valve 36. The valve assembly 100 described herein allows a user to tighten a connection from the water source 27 to the valve assembly 100 with the appropriate amount of torque. The system utilizes sound and tactile feedback to indicate to the user that an appropriate amount of torque has been applied to secure the connection from the water source 27 to the valve assembly 100. Therefore, the system allows the user to apply the appropriate amount of torque to the connection between the water source 27 and the valve assembly 100 with ease and without the need of a special tool, such as a torque wrench, which users, and even installation specialists, rarely keep in their inventory. Therefore, anyone who currently connects an inlet valve of a refrigerator to a water source typically makes a guess as to whether or not the appropriate amount of torque is applied.

The valve assembly 100 include a valve body 102, an inlet port 104, and a clutch 106. The inlet port 104 may include threading 108. The inlet port 104 in configured to receive a tube or conduit 110 to establish fluid communication between the valve assembly 100 and the water source 27, or more specifically to establish fluid communication between the valve body 102 and the water source 27. The inlet port 104, or more specifically the threading of the inlet port 104, may be configured to engage a fastener 112 to secure the conduit 110 to the inlet port 104. The fastener 112 may more specifically be a nut that defines an opening so that the conduit 110 may extend through the nut. A fitting 114 (e.g., a brass fitting) may be secured to the conduit 110. The fitting 114 may be conical-shaped and may be press-fit onto the conduit 110. An internal surface 116 along the top of the fastener 112 may engage the fitting 114 to secure the conduit 110 to the inlet port 104. A seal 118 may be disposed between the top of the inlet port 104, the internal surface 116 along the top of the fastener 112, and the conduit 110 in order to prevent water from leaking from the connection formed by the inlet port 104, fastener 112, and conduit 110.

The clutch 106 is disposed between the inlet port 104 and the valve body 102. The clutch 106 is configured to slip in response to an applied torque to the inlet port 104 exceeding a threshold. More specifically, the clutch 106 is configured to slip in response to a connecting torque between the fastener 112 and the inlet port 104 exceeding the threshold. The clutch 106 may more specifically be a one-way clutch that is configured to slip in a first direction 122 in response to the applied torque to the inlet port 104 exceeding the threshold in the first direction 122. More specifically, the clutch 106 may be configured to slip in the first direction 122 in response to the connecting torque between the fastener 112 and the inlet port 104 exceeding the threshold exceeding the threshold in the first direction 122.

The clutch 106 may comprise a ratcheting mechanism or a ratchet. The clutch 106 may include one or more flexible arms 124 that are secured to the inlet port 104 and one or more ramping features or ramps 126 that are secured the valve body 102. The flexible arms 124 may each include a complimentary ramping feature or ramp at the end of each flexible arm 124 that engage the ramping features or ramps 126. Engagement between the one or more flexible arms 124 (or more specifically the complimentary ramping features or ramps at the ends of the flexible arms 124) and the one or more ramps 126 prevents or inhibits slip in the first direction 122 in response to the applied torque to the inlet port 104 being less than the threshold in the first direction 122. More specifically, the engagement between the one or more flexible arms 124 and the one or more ramps 126 prevents or inhibits slip in the first direction 122 in response to the connecting torque between the fastener 112 and the inlet port 104 being less than the threshold in the first direction 122.

The interaction between the one or more flexible arms 124 and the one or more ramps 126 in the first direction 122 allows for the tightening of the fastener 112 over the threading 108. Once the torque limit is reached, the one or more flexible arms 124 skip over the one or more ramps 126 creating a clicking sound and/or providing a tactile feedback. This indicates to the user that an appropriate or desired amount of torque has been applied to fastener 112 to the inlet port 104. No additional torque can be applied at this point, which helps to prevent damaging the fastener 112 or inlet port 104 (e.g., breaking the neck of an inlet port 104) during installation.

Each of one or more flexible arms 124 includes a first stop 128 and each of the one or more ramps 126 includes a second stop 130. Each of the first stops are configured to engage one of the second stops 130 to prevent rotation of the inlet port 104 in a second direction 132, which is opposite to the first direction 122, in order facilitate removal of the fastener 112 and conduit 110. Applying torque in the second direction 132 results in the clutch 106 locking, which allows the user to unscrew the fastener 112 from the inlet port 104 (e.g., for servicing purposes).

A second seal 134 may be disposed between the valve body 102 and the inlet port 104 to prevent water from leaking between the valve body 102 and the inlet port 104. A bracket 136 may be utilized to secure the valve assembly 100 to a frame structure of the refrigerator appliance 10. A top plate 138 of the bracket 136 may trap and secure the inlet port 104 and the one or more flexible arms 124 to the valve body 102 and within a pocket 140 defined by the valve body 102. The inlet port 104 may include wrench flats 142, which may form a hexagon shape. A tool such as a wrench or socket may engage the wrench flats 142 to secure the position of the inlet port 104 while securing or removing the fastener 112 to or from the inlet port 104 in the event the clutch 106 has been damaged.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A refrigerator comprising:
   a water system configured to direct water to a dispenser or an ice maker; and
   a valve configured to connect the water system to a water source, the valve having
      a valve body having (i) a recessed surface defining pocket and (ii) a conduit extending from the recessed surface and out of the pocket,
      an inlet port (i) having a base portion and (ii) an externally threaded portion extending from base portion, wherein (a) the base portion and the externally threaded portion collectively define a central opening, (b) the base portion is disposed within the pocket, (c) the conduit is received within the central opening, (d) the externally threaded portion extends outward and away from the pocket, (e) the central opening is configured to receive a tube on an opposing side of the central opening relative to the conduit to establish fluid communication with the water source, and (f) the externally threaded portion is configured to engage a nut to secure the tube to the inlet port, and
      a clutch (i) comprising the base portion and regions of the valve body that are disposed radially around the base portion within the pocket and (ii) configured to slip in response to an applied torque to the inlet port exceeding threshold, wherein the clutch slipping corresponds to the inlet port rotating about the conduit; and
   a plate (i) defining an orifice and (ii) disposed on the valve body and over the pocket such that (a) the clutch is sandwiched between the recessed surface and the plate, (b) the inlet port extends through the orifice, and (c) the externally threaded portion is disposed on an opposing side of the plate relative to the base portion.

2. The refrigerator of claim 1, wherein the nut is disposed around the tube and engages the externally threaded portion securing the tube to the inlet port.

3. The refrigerator of claim 2, wherein the clutch is configured to slip in response to an applied torque between the nut and the inlet port exceeding the threshold.

4. The refrigerator of claim 1, wherein (i) the clutch is a one-way clutch that is configured to slip in a first direction in response to the applied torque to the inlet port exceeding the threshold in the first direction and (ii) the one-way clutch includes flexible arms that are secured to the inlet port and ramping features that are secured the valve body.

5. The refrigerator of claim 4, wherein the flexible arms include a first set of stopping surfaces, the ramping features include a second set of stopping surfaces, and the first set of stopping surfaces is configured to engage the second set of stopping surfaces to prevent rotation of the inlet port in a second direction, which is opposite to the first direction, to facilitate removal of the nut.

6. The refrigerator of claim 5, wherein each flexible arms flares outward in a direction extending toward a corresponding stopping surface of the first set of stopping surfaces.

7. The refrigerator of claim 1, wherein (i) the inlet port defines wrench flats between the base portion and the externally threaded portion and (ii) the wrench flats are disposed on the opposing side of the plate relative to the base portion.

8. An inlet water valve for a refrigerator comprising:
a valve body having (i) a recessed surface defining pocket and (ii) a first conduit extending from the recessed surface and out of the pocket;
a threaded inlet (i) having a base portion and (ii) a threaded portion extending from base portion, wherein (a) the base portion and the threaded portion collectively define a central opening, (b) the base portion is disposed within the pocket, (c) the first conduit is received within the central opening, (d) the threaded portion extends outward and away from the pocket, (e) the central opening is configured to receive a second conduit on an opposing side of the central opening relative to the first conduit to establish fluid communication between a water source and the valve body, and (f) the threaded portion in configured to engage a fastener to secure the second conduit to the threaded inlet;
a clutch (i) comprising the base portion and regions of the valve body that are disposed radially around the base portion within the pocket and (ii) configured to slip in response to a connecting torque between the fastener and the threaded inlet exceeding threshold; and
a plate (i) defining an orifice and (ii) disposed on the valve body and over the pocket such that (a) the clutch is sandwiched between the recessed surface and the plate, (b) the threaded inlet extends through the orifice, and (c) the threaded portion is disposed on an opposing side of the plate relative to the base portion.

9. The inlet water valve of claim 8, wherein (i) the clutch is a one-way clutch and (ii) the one-way clutch includes at least one flexible arm that is secured to the threaded inlet and at least one ramp that is secured the valve body.

10. The inlet water valve of claim 9, wherein the one-way clutch is configured to slip in a first direction in response to the connecting torque exceeding the threshold in the first direction.

11. The inlet water valve of claim 10, wherein engagement between the at least one flexible arm and the at least one ramp inhibits slip in the first direction in response to the connecting torque being less than the threshold in the first direction.

12. The inlet water valve of claim 10, wherein the at least one flexible arm includes at least one first stop, the at least one ramp includes at least one second stop, and the at least one first stop is configured to engage the at least one second stop to prevent rotation of the threaded inlet in a second direction, which is opposite to the first direction, in order facilitate removal of the fastener and second conduit.

13. The inlet water valve of claim 12, wherein the at least one flexible arm flares outward in a direction extending toward a corresponding stop of the at least one first stop.

14. The inlet water valve of claim 8, wherein (i) the threaded inlet defines wrench flats between the base portion and the threaded portion and (ii) the wrench flats are disposed on the opposing side of the plate relative to the base portion.

15. A valve comprising:
a valve body having (i) a recessed surface defining pocket and (ii) a first conduit extending from the recessed surface and out of the pocket;
an inlet port (i) having a base portion and (ii) a threaded portion extending from base portion, wherein (a) the base portion and the threaded portion collectively define a central opening, (b) the base portion is disposed within the pocket, (c) the first conduit is received within the central opening, (d) the threaded portion extends outward and away from the pocket, (e) the central opening is configured to receive a second conduit on an opposing side of the central opening relative to the first conduit to establish fluid communication with a water source and (f) the threaded portion is configured to engage a fastener to secure the second conduit to the inlet port; and
a clutch (i) comprising the base portion and regions of the valve body that are disposed radially around the base portion within the pocket and (ii) configured to slip in response to a connecting torque between the fastener and the inlet port exceeding a threshold; and
a plate (i) defining an orifice and (ii) disposed on the valve body and over the pocket such that (a) the clutch is sandwiched between the recessed surface and the plate, (b) the inlet port extends through the orifice, and (c) the threaded portion is disposed on an opposing side of the plate relative to the base portion.

16. The inlet water valve of claim 15, wherein (i) the clutch is a one-way clutch configured to slip in a first direction in response to the connecting torque exceeding the threshold in the first direction and (ii) the one-way clutch includes a flexible arm that is secured to the inlet port and a ramp that is secured the valve body.

17. The inlet water valve of claim 16, wherein engagement between the flexible arm and the ramp inhibits slip in the first direction in response to the connecting torque being less than the threshold in the first direction.

18. The inlet water valve of claim 16, wherein the flexible arm includes a first stop, the ramp includes a second stop, and the first stop is configured to engage the second stop to prevent rotation of the inlet port in a second direction, which is opposite to the first direction, in order facilitate removal of the fastener and second conduit.

19. The inlet water valve of claim 18, wherein the flexible arm flares outward in a direction extending toward the first stop.

20. The inlet water valve of claim 15, wherein (i) the inlet port defines wrench flats between the base portion and the threaded portion and (ii) the wrench flats are disposed on the opposing side of the plate relative to the base portion.

* * * * *